United States Patent [19]

Kendziorski

[11] Patent Number: 4,968,766
[45] Date of Patent: Nov. 6, 1990

[54] FLUOROSILICONE COMPOUNDS AND COMPOSITIONS FOR ADHESIVE RELEASE LINERS

[75] Inventor: Craig K. Kendziorski, Midland County, Mich.

[73] Assignee: Dow Corning Corporation, Midland, Mich.

[21] Appl. No.: 296,468

[22] Filed: Jan. 12, 1989

[51] Int. Cl.$^5$ .............................................. C08G 77/20
[52] U.S. Cl. ...................................... 528/32; 528/10; 528/31; 528/42; 528/15; 528/37; 556/488
[58] Field of Search ....................... 528/42, 31, 32, 10, 528/37, 15; 556/488

[56] References Cited

U.S. PATENT DOCUMENTS 4,736,048  4/1988  Brown et al. ...................... 556/454

FOREIGN PATENT DOCUMENTS 225581  10/1987  Japan .

*Primary Examiner*—Melvyn I. Marquis
*Attorney, Agent, or Firm*—George A. Grindahl

[57] ABSTRACT

A new organohydrogenpolysiloxane compound and a new fluorosilicone polymer each have unique properties which allow for the preparation of faster curing coating compositions having longer bath life than those disclosed in the art. In a preferred embodiment the new polymers are mixed together to provide, along with a metal-containing hydrosilylation catalyst and a catalyst inhibitor to provide improved coating compositions which are useful for preparing a release liner to protect silicone pressure sensitive adhesives.

3 Claims, No Drawings

# FLUOROSILICONE COMPOUNDS AND COMPOSITIONS FOR ADHESIVE RELEASE LINERS

BACKGROUND OF THE INVENTION

The present invention relates generally to curable coating compositions for the preparation of a protective release backing, i.e. a liner, for silicone pressure sensitive adhesives, herein also called SPSAs. In one aspect this invention relates to a unique organohydrogenpolysiloxane compound and to improved curable coating compositions comprising said compound. In a second aspect this invention relates to a unique fluorosilicone polymer and to improved curable coating compositions comprising said fluorosilicone polymer.

Recently, Brown and Stickles, U.S. Pat. No. 4,736,048, disclosed a fluorosilicone polymer, a curable composition, a release liner and a SPSA/liner laminate. Patentees' liner is said to be useful for releasing solvent-cast, heat-cured SPSAs with a force of no more than 200 grams per inch (g/in). However, the fluorosilicone coating compositions that are used by Brown and Stickles do not cure within 15 seconds at 121° C.

Izumiya et al., Japanese Laid Open (Kokai) No. 225,581/87 disclose a release agent composition comprising a vinyl-substituted fluorosilicone polymer containing in-the-chain vinyl groups, a hydrogen-terminated fluorosilicone polymer containing in-the-chain silicon-bonded hydrogen atoms and chloroplatinic acid. Although this composition is said to provide a release liner having a peel adhesion of 110 g/25mm and a subsequent adhesion of 65% Patentees have not disclosed the cure rate and bath life for the composition and they have not taught the proportions of the fluorosilicone polymer and crosslinker to use. Regardless of the cure rate the disclosed composition would have little commercial value since its bath life would be unacceptably short in the absence of a catalyst inhibitor.

BRIEF SUMMARY OF THE INVENTION

It is an object of this invention to provide improved fluorosilicone coating compositions. It is another object of this invention to provide a new organohydrogenpolysiloxane compound that is useful for more rapidly crosslinking a fluorosilicone polymer. It is a further object of this invention to provide a new fluorosilicone polymer which can be more rapidly cured with an organohydrogenpolysiloxane compound. It is a particular object of this invention to provide a curable coating composition which is useful for preparing a liner for SPSAs and which has fast cure time and long bath life.

These objects, and others which will be apparent upon considering the following disclosure and appended claims, are obtained by the present invention which, briefly stated, relates to a new organohydrogenpolysiloxane compound having the formula $Me_3SiO(MeHSiO)_m\{(RQ)MeSiO\}_nSiMe_3$, a new fluorosilicone polymer having the formula $ViMe_2SiO(Me_2SiO)_x\{(RQ)MeSiO\}_y(MeViSiO)_zSiMe_2Vi$, and to curable coating compositions comprising one or both of said new polymers. The new organohydrogenpolysiloxane compound can be used to cure any fluorosilicone polymer and the new fluorosilicone polymer can be cured by any organohydrogenpolysiloxane. A preferred embodiment of the invention is a curable coating composition comprising the organohydrogenpolysiloxane and the fluorosilicone polymer of this invention.

DETAILED DESCRIPTION OF THE INVENTION

In a first aspect the present invention relates to an organohydrogenpolysiloxane compound having the formula $Me_3SiO(MeHSiO)_m\{(RQ)MeSiO\}_nSiMe_3$, wherein $m+n$ has a value of from 20 to 80, $m/(m+n)$ has a value of 0.6 to 0.8, Me denotes a methyl radical, RQ denotes a silicon-bonded fluorinated radical wherein R denotes a perfluoroalkyl radical having from 4 to 8 carbon atoms and Q denotes an alkylene radical linking R to Si through at least 2 carbon atoms.

In the formula for the organohydrogenpolysiloxane the R radicals can be identical or different and can have a normal or a branched structure. Examples of suitable R radicals include $C_4F_9$—, such as $CF_3CF_2CF_2CF_2$—, $(CF_3)_2CFCF_2$—, $(CF_3)_3C$— and $CF_3CF_2(CF_3)CF$—; $C_5F_{11}$—, such as $CF_3CF_2CF_2CF_2CF_2$—; $C_6F_{13}$—, such as $CF_3(CF_2)_4CF_2$—; $C_7F_{15}$—, such as $CF_3(CF_2CF_2)_3$—; and $C_8F_{17}$—. Although this invention has not been investigated with organohydrogenpolysiloxanes containing perfluoroalkyl radicals larger than perfluorobutyl it is reasonable, and within the scope and spirit of the present invention, that R can be larger.

Each perfluoroalkyl radical is bonded to a silicon atom by way of Q, an alkylene radical which separates R from Si by at least two carbon atoms. Each Q radical can have a normal or branched structure. Examples of suitable alkylene radicals include —$CH_2CH_2$—, —$CH_2CH_2CH_2$—, —$CH(CH_3)CH_2$—, —$(CH_2CH_2)_2$—, —$CH(CH_3)CH_2CH_2$— and —$CH_2(CH_3)CHCH_2$—.

Each fluorinated radical, RQ, preferably has the formula $RCH_2CH_2$—, and more preferably $CF_3CF_2CF_2CF_2CH_2CH_2$—.

In the formula for the organohydrogenpolysiloxane $m$ and $n$ represent numbers whose average values are preferably 28 and 12, respectively. Without limiting the present invention we theorize that the organohydrogenpolysiloxane compound of this invention has a cure-accelerating effect in curable fluorosilicone compositions because it has improved solubility in a fluorosilicone polymer, due to the presence of silicon-bonded RQ radicals in the organohydrogenpolysiloxane and in the fluorosilicone polymer, and because the silicon-bonded hydrogen atoms of the organohydrogenpolysiloxane are, on average, distributed along the polymer backbone in groups of two or three, separated by siloxane units which are free of silicon-bonded hydrogen atoms.

Slightly more or less distributing of the silicon-bonded hydrogen atoms in the organohydrogenpolysiloxane, by the use, for example, of up to 10% more or up to 10% less than the 70% of methylhydrogensiloxane units in the organohydrogenpolysiloxane that is represented by the $m=28$, noted above, would be expected to provide substantially the same unusual curing properties of a curable coating composition that have been observed for $m=28$ and $n=12$, and are within the scope and spirit of this invention. That is to say, the value of $m$ can vary so that the number of methylhydrogensiloxane units represents from 60 to 80 percent of the total number of in-the-chain siloxane units, i.e., $m/(m+n)=0.6$ to $0.8$.

In like manner, a total value for $\underline{m}+\underline{n}$ of up to 100% more and up to 50% less than the 40 noted above, would not be considered to provide a significantly different result than that observed for the organohydrogenpolysiloxane having 40 in-the-chain siloxane units, and would fall within the scope and spirit of this invention. In other words, the organohydrogenpolysiloxane compound can have from 20 to 80 in-the-chain siloxane units and still display the same unusual curing properties of a curable coating composition that have been observed for an organohydrogenpolysiloxane having 40 in-the-chain siloxane units.

It is to be noted that these values of $\underline{m}$ and $\underline{n}$ are average values, as is well appreciated in the art, and that there will likely be molecules of organohydrogenpolysiloxane compound therein wherein the values of $\underline{m}$ and $\underline{n}$ are much less or much more than the average values.

The organohydrogenpolysiloxane compound of this invention provides faster curing and/or longer bath life for a fluorosilicone coating composition, compared to the poly(methylhydrogensiloxane) compounds of the art. This aspect of the invention thus also relates to a curable coating composition comprising (A') a fluorosilicone polymer having the formula AMe$_2$SiO(Me$_2$SiO)$_x${(RQ)MeSiO}$_y$(MeASiO)$_z$SiMe$_2$A, wherein A denotes an alkenyl radical, Me denotes a methyl radical, RQ denotes a silicon-bonded fluorinated radical wherein R denotes a perfluoroalkyl radical having from 2 to 8 carbon atoms, Q denotes a divalent hydrocarbon radical linking R to Si through at least 2 carbon atoms, and the values of $\underline{x}$, $\underline{y}$ and $\underline{z}$ are such that the fluorosilicone polymer contains at least 5 mol percent (RQ)MeSiO$_{2/2}$ siloxane units and 0.1 to 10 mol percent alkenyl radical-containing siloxane units; (B) an organohydrogenpolysiloxane compound, compatible with (A'), having the formula Me$_3$SiO(MeHSiO)$_m${(RQ)MeSiO}$_n$SiMe$_3$, wherein $\underline{m}+\underline{n}$ has a value of from 20 to 80, $\underline{m}/(\underline{m}+\underline{n})$ has a value of 0.6 to 0.8, Me denotes a methyl radical, RQ denotes a silicon-bonded fluorinated radical wherein R denotes a perfluoroalkyl radical having from 4 to 8 carbon atoms and Q denotes an alkylene radical linking R to Si through at least 2 carbon atoms, the quantities of (A') and (B) being sufficient to provide from 1 to 4 silicon-bonded hydrogen atoms for every alkenyl radical in the composition; (C) a catalytic amount of a metal-containing hydrosilylation catalyst; and (D) an effective amount of an inhibitor for the metal-containing hydrosilylation catalyst.

In the above-formula for the fluorosilicone polymer (A') A denotes any alkenyl radical. Examples of alkenyl radicals suitable for use as A include vinyl, allyl, butenyl, pentenyl, hexenyl, octenyl and decenyl. Preferably the aliphatic unsaturation in the alkenyl radicals is in the terminal, i.e. the omega position.

Also in the above-formula for the fluorosilicone polymer (A') RQ encompasses the same meaning, and more, that is denoted for the RQ radicals of the organohydrogenpolysiloxane compound (B), including preferred embodiments thereof. That is to say, in addition to the R radicals disclosed for the organohydrogenpolysiloxane compound (B) it is thought that the R radicals in the fluorosilicone polymer (A') can have fewer than 4 carbon atoms, such as two or three, and more than 8 carbon atoms, such as nine or ten, in addition to 4 to 8 carbon atoms. Additionally, the Q radicals of fluorosilicone polymer (A') can include the alkylene radicals of organohydrogenpolysiloxane compound (B), as well as other divalent hydrocarbons which are free of aliphatic unsaturation, such as phenyl, tolyl and benzyl.

In general, the organohydrogenpolysiloxane compound of the compositions of this invention must be compatible with, i.e. soluble in, the fluorosilicone polymer that is present therein, in order to obtain the desired objects of this invention. Accordingly, the RQ radicals of the organohydrogenpolysiloxane compound must not be so different from the RQ radicals of the fluorosilicone polymer that said compatibility is lost. Although the RQ radicals of the fluorosilicone polymer can be different from the RQ radicals of the organohydrogenpolysiloxane compound, they are preferably the same.

General examples of the fluorosilicone polymer (A') include, but are not limited to, the following:

ViMe$_2$SiO(Me$_2$SiO)$_{0.90t}$(MeViSiO)$_{0.05t}$(RQMeSiO)$_{0.05t}$SiMe$_2$Vi,

ViMe$_2$SiO(Me$_2$SiO)$_{0.70t}$(MeViSiO)$_{0.01t}$(RQMeSiO)$_{0.29t}$SiMe$_2$Vi,

ViMe$_2$SiO(Me$_2$SiO)$_{0.70t}$(RQMeSiO)$_{0.30t}$SiMe$_2$Vi, and ViMe$_2$SiO(MeViSiO)$_{0.05t}$(RQMeSiO)$_{0.95t}$SiMe$_2$Vi, wherein the viscosity of the polymer ranges from that of a freely flowing liquid to a slowly flowing gum and $\underline{t}$ has a value of from 100 to 10,000 and more.

In the above-formula for the fluorosilicone polymer (A') the values of $\underline{x}$ and $\underline{z}$ can be as small as zero but the value of $\underline{y}$ must be at least one. The value of $\underline{x}+\underline{y}+\underline{z}$ can range to 10,000 and more. The value of $\underline{z}$ typically is limited to a fraction, such as from zero to 1/10, of the sum of $\underline{x}+\underline{y}+\underline{z}$. The values of $\underline{x}$, $\underline{y}$ and $\underline{z}$ are such that the fluorosilicone polymer (A') contains from 0.1 to 10, preferably 0.1 to 1.0, mol percent alkenyl radical-containing siloxane units and at least 5, preferably 20 to 50, and most preferably 30 mol percent (RQ)MeSiO$_{2/2}$ siloxane units.

Component (B) is the same organohydrogenpolysiloxane compound as the organohydrogenpolysiloxane compound of this invention, including preferred embodiments, delineated above.

The quantity of Component (B) is to be sufficient to provide 1 to 4 silicon-bonded hydrogen atoms per alkenyl radical in Component (A'); however, when the alkenyl radical is vinyl the quantity of Component (B) is preferred to be sufficient to provide 2 to 4 silicon-bonded hydrogen atoms per vinyl radical.

Component (C) that is used in the curable coating compositions of this invention is any metal-containing hydrosilylation catalyst which will accelerate the reaction of the alkenyl radicals of the fluorosilicone polymer with the silicon-bonded hydrogen atoms of the organohydrogenpolysiloxane compound, particularly at elevated temperature. Examples of this component include chloroplatinic acid, chloroplatinic acid-olefin complexes, chloroplatinic acid-vinylsiloxane complexes, and platinum supported on a microparticulate carrier such as alumina. A particularly useful platinum-containing catalyst is the chloroplatinic acid-vinylsiloxane complex disclosed by Willing in U.S. Pat. No. 3,419,593, hereby incorporated by reference. However, the platinum-containing catalyst can be any of the well-known materials that are effective for catalyzing the hydrosilylation reaction of silicon-bonded hydrogen atoms with silicon-bonded alkenyl radicals.

The exact amount of Component (C) will depend on the particular catalyst that is used and is not easily predicted. However, for chloroplatinic acid and its complexes, an amount sufficient to provide from .1 to 1000, preferably 1 to 500, parts by weight of platinum for every one million parts by weight of Components (A')+(B). Within this range routine experimentation can be used to determine the optimum amount of catalyst needed for any particular cure time.

Component (D) of the curable coating compositions of this invention is any inhibitor for the metal-containing hydrosilylation catalyst. Examples thereof are the ene-ynes, such as ethynylcyclohexene, 3-methyl-3-pentene-1-yne and 3,5-dimethyl-3-hexene-1-yne; the alkynyl alcohols, such as 3-methyl-1-butyne-3-ol, 3,5-dimethyl-1-hexyne-3-ol, 3-methyl-1-pentyne-3-ol, and phenylbutynol; the esters of unsaturated alcohols and/or unsaturated acids, such as diallyl maleate and bis-(2-methoxyisopropyl) maleate. The reader is referred to, for example, the disclosures of U.S. Pat. Nos. 3,445,420; 4,256,870; 4,465,818 and 4,562,096 to further illustrate component (D).

The exact amount of Component (D) will depend on the particular inhibitor that is used and is not easily predicted. It is only necessary to use an amount of inhibitor that will sufficiently delay the curing reaction of the curable coating composition, at ambient conditions, in order to permit the application of the composition to a substrate, as desired. Routine experimentation, and the Examples disclosed below, can be used to determine the optimum amount of inhibitor needed for any particular cure time. For chloroplatinic acid and its complexes, an amount of inhibitor sufficient to provide from .1 to 100, preferably 1 to 10, molecules of inhibitor for every platinum atom is usually sufficient.

In a second aspect the present invention relates to a unique fluorosilicone polymer (A) which has the formula $ViMe_2SiO(Me_2SiO)_x\{(RQ)MeSiO\}_y(MeViSiO)_zSiMe_2Vi$, wherein Vi denotes a vinyl radical, Me denotes a methyl radical, RQ denotes a silicon-bonded fluorinated radical wherein R denotes a perfluoroalkyl radical having from 4 to 8 carbon atoms, Q denotes an alkylene radical linking R to Si through at least 2 carbon atoms, and the values of $x$, $y$ and $z$ are such that the fluorosilicone polymer contains at least 300 silicon atoms, from 0.5 to 2 mol percent vinyl radical-containing siloxane units and 30 mol percent $(RQ)MeSiO_{2/2}$ siloxane units.

The meanings of R and Q in the above-formula for component (A) are the same as the meanings noted above for R and Q in the organohydrogenpolysiloxane compound (B) of this invention.

The meanings of $x$, $y$ and $z$ in the formula for (A) are limited so that there are at least 300 silicon atoms in the fluorosilicone polymer. It has been observed that, regardless of the organohydrogenpolysiloxane compound that is used to cure the fluorosilicone polymer, when the value of $x+y+z$ is 100 or less the coating composition prepared therefrom displays high release values for a SPSA which has been cast and cured thereon. On the other hand, when the value of $x+y+z$ is 300 or more the coating composition prepared therefrom displays low release values for a SPSA which has been cast and cured thereon, provided the number of siloxane units bearing vinyl radicals does not exceed 2 percent, and preferably 1 percent, of the total number of siloxane units. Thus, the meanings of $x$, $y$ and $z$ in the formula for (A) are also limited so that there are from 0.5 to 2 mol percent vinyl radical-containing siloxane units in the fluorosilicone polymer.

The fluorosilicone polymer of this invention (A) can be mixed with any organohydrogenpolysiloxane compound of the art to provide a curable composition which has unique curing properties. Thus the second aspect of the present invention further relates to a curable coating composition comprising (A) a fluorosilicone polymer having the formula $ViMe_2SiO(Me_2SiO)_x\{(RQ)MeSiO\}_y(MeViSiO)_zSiMe_2Vi$, wherein Vi denotes a vinyl radical, Me denotes a methyl radical, RQ denotes a silicon-bonded fluorinated radical wherein R denotes a perfluoroalkyl radical having from 4 to 8 carbon atoms, Q denotes an alkylene radical linking R to Si through at least 2 carbon atoms, and the values of $x$, $y$ and $z$ are such that the fluorosilicone polymer contains at least 300 silicon atoms, from 0.5 to 2 mol percent vinyl radical-containing siloxane units and 30 mol percent $(RQ)MeSiO_{2/2}$ siloxane units; (B') an organohydrogenpolysiloxane compound, compatible with (A), having an average of at least three silicon-bonded hydrogen atoms per molecule with the hydrogen radicals being bonded to separate silicon atoms, the quantities of (A) and (B') being sufficient to provide from 2 to 4 silicon-bonded hydrogen atoms for every vinyl radical in the composition; (C) a catalytic amount of a metal-containing hydrosilylation catalyst; and (D) an effective amount of an inhibitor for the metal-containing hydrosilylation catalyst.

Component (A) is the same as the fluorosilicone polymer of this invention, delineated above, including preferred embodiments thereof.

Component (B') is an organohydrogenpolysiloxane having an average of at least 2 silicon-bonded hydrogen atoms in each molecule and functions as a crosslinker for Component (A). Component (B') can be any of the currently known organohydrogenpolysiloxanes having an average of at least two, and preferably three or more, silicon-bonded hydrogen atoms per silicon atom. The molecular structure of this component is not critical and can be cyclic, linear, branched and/or network, as desired. The organic radicals in Component (B') can be any monovalent hydrocarbon radical free of aliphatic unsaturation, as is well known, such as for example, alkyl radicals such as methyl, ethyl and propyl; and aryl radicals such as the phenyl radical. Preferably these monovalent hydrocarbon radicals contain from 1 to 6 carbon atoms and methyl is in general preferred. For maximum compatibility of Components (A) and (B') the organic radicals in each component are preferably the same.

Examples of Component (B') include, but are not limited to, cyclic, linear and resinous siloxanes; such as methylhydrogencyclopolysiloxanes having the unit formula $MeHSiO_{2/2}$; linear methylhydrogenpolysiloxanes having the formulae $Me_3SiO(MeHSiO)_i(Me_2SiO)_jSiMe_3$ and $HMe_2SiO(MeHSiO)_i(Me_2SiO)_jSiMe_2H$ where i and j have values of zero or more; and branched siloxanes such as $(HMe_2SiO)_4Si$. The terminal siloxane units of this linear siloxane are not critical and can be triorganosiloxane units or diorganohydrogensiloxane units or mixtures thereof, wherein the organic radicals are, for example, methyl.

Examples of Component (B') include compounds having the formula $Me_3SiO(MeHSiO)_a(Me_2SiO)_bSiMe_3$ wherein $a$ has an average value of at least 3 and $b$ has an average value of 0 or more and compounds having the formula $Me_3SiO(MeHSiO)_aSiMe_3$ wherein $a$ has a value of from 30 to 70.

To improve the compatibility of the organohydrogenpolysiloxane (B') with the fluorosilicone polymer (A) it is desirable to have up to half of the organic radicals in (B') be RQ radicals, where R is preferably the same as it is in (A), and the remaining organic radicals being methyl radicals.

Thus, the fluorosilicone crosslinkers disclosed by Holbrook in U.S. Pat. No. 3,344,160 and by Carter et al. in U.S. Pat. No. 4,057,566, incorporated herein by reference, and organohydrogenpolysiloxanes having the general formulae $Me_3SiO(MeHSiO)_i\{(RQ)MeSiO\}_kSiMe_3$ and $HMe_2SiO(MeHSiO)_i\{(RQ)MeSiO\}_k SiMe_2H$ where $\underline{i}$ and $\underline{k}$ have values of zero or more, provided that the organohydrogenpolysiloxane contains an average of at least two silicon-bonded hydrogen atoms, are preferred organohydrogenpolysiloxanes in the curable coating compositions of this invention.

The quantity of Component (B') is to be sufficient to provide 2 to 4 silicon-bonded hydrogen atoms per vinyl radical in Component (A).

Components (C) and (D) are the same as those disclosed above and the amounts thereof are likewise the same as disclosed above.

In view of the favorable curing rate that it provides for curable coating compositions of this invention the organohydrogenpolysiloxane compound (B) of this invention is a preferred Component (B'). Thus, a preferred embodiment of this invention comprises a curable coating composition comprising (A) a fluorosilicone polymer having the formula $ViMe_2SiO(Me_2SiO)_x\{(RQ)MeSiO\}_y(MeViSiO)_zSiMe_2Vi$, wherein Vi denotes a vinyl radical, Me denotes a methyl radical, RQ denotes a silicon-bonded fluorinated radical wherein R denotes a perfluoroalkyl radical having from 4 to 8 carbon atoms, Q denotes an alkylene radical linking R to Si through at least 2 carbon atoms, and the values of $\underline{x}$, $\underline{y}$ and $\underline{z}$ are such that the fluorosilicone polymer contains at least 300 silicon atoms, from 0.5 to 2 mol percent vinyl radical-containing siloxane units and 30 mol percent $(RQ)MeSiO_{2/2}$ siloxane units; (B) an organohydrogenpolysiloxane compound, compatible with (A), having the formula $Me_3SiO(MeHSiO)_m\{(RQ)MeSiO\}_nSiMe_3$, wherein $\overline{m+n}$ has a value of from 20 to 80, $\underline{m/(m+n)}$ has a value of 0.6 to 0.8, Me denotes a methyl radical, RQ denotes a silicon-bonded fluorinated radical wherein R denotes a perfluoroalkyl radical having from 4 to 8 carbon atoms and Q denotes an alkylene radical linking R to Si through at least 2 carbon atoms, the quantities of (A) and (B) being sufficient to provide from 2 to 4 silicon-bonded hydrogen atoms for every vinyl radical in the composition; (C) a catalytic amount of a metal-containing hydrosilylation catalyst; and (D) an effective amount of an inhibitor for the metal-containing hydrosilylation catalyst.

The essential components and their relative amounts, including preferred embodiments, of this preferred curable coating composition of this invention have all been fully delineated above.

Silicone polymers bearing RQ radicals can be prepared by any of several method disclosed in the art such as, for example, the method of Pierce et al., U.S. Pat. No. 2,961,425; or the method of Brown et al., U.S. Pat. No. 4,736,048. The patents to Brown et al. and to Pierce et al. are incorporated herein by reference to show how to prepare fluorosilicone polymers.

Organohydrogenpolysiloxanes bearing RQ radicals can be synthesized by well-known methods involving acid-catalyzed siloxane equilibration reactions. In addition to the methods of Holbrook et al. and of Carter et al., noted above, the methods of Pierce et al., and of Brown et al., also noted above for the preparation of silicone polymers bearing RQ radicals, can be used with the proviso that silane and/or siloxane intermediates bearing silicon-bonded hydrogen atoms be included as reactants in the synthesis methods disclosed.

The curable coating compositions of this invention can further comprise various amounts of optional components that will not adversely limit its use as a coating composition for the release of SPSAs. Examples thereof include reactive components, such as adhesion promoters, antioxidants and stabilizers; and unreactive components such as diluents to decrease the viscosity and/or to increase the coatability of the curable composition, pigments, stabilizers and fillers.

Preferred diluents include halogenated solvents, such as chlorofluorocarbons; esters, such as ethyl acetate; ketones such as methylisobutyl ketone; and ethers, such as dibutyl ether.

The curable coating compositions of this invention are useful for preparing a liner for SPSAs. The liner is to be prepared by coating a backing, preferably a flexible polymeric sheeting, with a chlorofluorocarbon solvent-solution of the curable coating composition. The backing that is used to manufacture a liner can be any flexible material such as, for example, polymeric film, such as films of polyester, polyolefin, or polyimide; metal foil; polymeric film-coated metal foil; paper; and polymeric film-coated paper.

The compounds of this invention provide compositions of this invention which cure rapidly at moderate temperatures, yet have a long bath life at room temperature.

The following examples are disclosed to further teach how to practice the present invention and should not be taken as limiting the invention, which is properly delineated by the appended claims.

All parts and percentages are by weight unless otherwise noted. Me and Vi denote methyl and vinyl, respectively. Temperatures are degrees Celsius.

Each curable coating composition was coated onto a piece of 2-mil polyester film using a #12 Mayer Rod and the coated films were heated at 121° or at 150°, in 15 second increments, until the coating was cured. The state of cure of a coating was determined by the ruboff, migration and smear tests.

Smear was measured by lightly rubbing the coating with a finger and observing the coating for a hazy appearance. The amount of haze was estimated and rated as none, very slight, slight, moderate or gross. A fully cured coating displays no haze and therefore has no smear.

Ruboff was measured by vigorously rubbing the coating with the index finger tip, trying to remove the coating from the paper. The amount of ruboff was estimated and rated as none, very slight, slight, moderate or gross. A fully cured coating displays no ruboff.

Migration was measured by placing a strip of SpecTape(R) ST-400C brand transparent tape (SpecTape, Inc., Erlanger, KY 41018) on the coating, adhesive-bearing surface in contact with the coating, and rubbing the strip 5 to 10 times with a finger to adhere the strip to the coating. The strip was then removed and its adhesive-bearing surface doubled back on itself and slowly separated. The difference in force, relative to the force needed to separate a doubled, unexposed strip, was then estimated and rated as none, very slight, slight, moderate or gross. A fully cured coating displays no difference and thus has no migration.

For release and subsequent adhesion testing a coating was coated onto a piece of 2-mil polyester film using a #12 Mayer Rod and the coated film was heated at 121° or at 150° for 60 seconds or until the coating was fully cured, whichever was longer. Thereafter (1, 3 or 7 days) a solution of adhesive was cast onto the cured coatings with a 3 mil Bird Bar and the applied adhesive was cured for 1 minute at 70° and then for 2 minutes at 178°. The resulting laminates were cooled to room temperature and a 2 mil polyester film support was laminated to the adhesive using a 4.5 pound roller. The laminates were allowed to age for 28 days at room temperature before being tested for release and subsequent adhesion.

The laminates were evaluated for release by cutting the laminates into 1×6 inch strips and the laminate was pulled apart at a rate of 12 inches/minute using a Keil Tester. The values recorded are the average of 5 readings taken during the course of one pull per sample. The Keil Tester is described in TAPPI, vol. 43, No. 8. pages 164A and 165A (August 1960).

Subsequent Adhesion of an adhesive was measured by applying the adhesive that had been pulled from the liner to a clean stainless steel panel, using two passes of a 4.5 pound roller, and measuring the force required to remove the tape therefrom at an angle of 180°, using the Keil Tester noted above.

Initial Adhesion of an adhesive was measured by applying cured adhesive, that had never been applied to a surface, to a clean stainless steel panel and measuring the force required to remove the tape therefrom, using a Keil Tester.

A peroxide-curing SPSA, available from Dow Corning Corporation as DOW CORNING (R) Q2-7406 Adhesive, was used in the examples. This adhesive was cured with 2% benzoyl peroxide The fluorosilicone polymers that are referenced in Tables 3, 4 and 5 have the formula and theoretical values of x, y and z as noted in Table 1. Polymers A, B, C, D, E, G and N were prepared by the method of Brown and Stickles, supra. Polymers F, H, I, J, K, L and M were prepared by the KOH-catalyzed equilibration of the appropriate hydrolyzed chlorosilanes.

The organohydrogenpolysiloxane compounds that are referenced in Tables 3, 4 and 5 have the formulae as noted in Table 2. Compound 1 is well known in the art. Compounds 2 and 3 were prepared by the $CF_3SO_3H$-catalyzed equilibration of the appropriate hydrolyzed chlorosilanes. Compound 4 is disclosed in U.S. Pat. No. 3,344,160.

TABLE 1

$ViMe_2SiO(Me_2SiO)_x\{(RQ)MeSiO\}_y(MeViSiO)_zSiMe_2Vi$ *

| POLYMER | dp | x | y | z | M % MeViSiO |
|---|---|---|---|---|---|
| A | 5000 | 3400 | 1500 | 100 | 2 |
| B | 5000 | 3100 | 1500 | 400 | 8 |
| C | 300 | 210 | 90 | 0 | 0 |
| D | 300 | 206 | 90 | 4 | 1.3 |
| E | 100 | 70 | 30 | 0 | 0 |
| F | 5000 | 3100 | 1500 | 400 | 8 |
| G | 30 | 21 | 9 | 0 | 0 |
| H | 300 | 188 | 90 | 22 | 7.3 |
| I | 300 | 210 | 90 | 0 | 0 |
| J | 500 | 350 | 150 | 0 | 0 |
| K | 2500 | 1700 | 750 | 50 | 2 |
| L | 2500 | 1725 | 750 | 25 | 1 |
| M | 2500 | 1737.5 | 750 | 12.5 | 0.5 |
| N | 300 | 186 | 90 | 24 | 8 |

* $RQ = CF_3CF_2CF_2CF_2CH_2CH_2$

TABLE 2

| COMPOUND | FORMULA |
|---|---|
| 1 | $Me_3SiO(MeHSiO)_{40}SiMe_3$ |
| 2 | $Me_3SiO(MeHSiO)_{28}\{(RQ)MeSiO\}_{12}SiMe_3$ * |
| 3 | $Me_3SiO(MeHSiO)_{28}(Me_2SiO)_{12}SiMe_3$ |
| 4 | $HMe_2SiO\{(CF_3CH_2CH_2)(HMe_2SiO)SiO\}_xSiMe_2H$ ** |

* $RQ = CF_3CF_2CF_2CF_2CH_2CH_2$.
** x = 2, on average.

Example 1

A mixture of heptane, cyclopolydimethylsiloxane, divinyltetramethyldisiloxane, cyclopolymethylvinylsiloxane, potassium hydroxide and hydroxyl-endblocked polydimethylsiloxane-co-polymethylperfluorobutylethylsiloxane (50:50) was heated at 150° for 4.5 hours, cooled to room temperature, neutralized with glacial acetic acid and filtered to give a fluorosilicone polymer having the structure shown for Polymer M in Table 1.

Example 2

A mixture of methylhydrogendichlorosilane, heptane methyl{(perfluorobutyl)ethyl}dichlorosilane, and trimethylchlorosilane, was slowly added to ice-cooled water to produce an hydrolysis mixture. The organic phase was separated, washed to neutrality, dried azeotropically (50° C/121mmHg), heated at 45° C/141mmHg for three hours in the presence of trifluoromethanesulfonic acid, cooled to room temperature, neutralized with sodium bicarbonate, filtered and devolatilized at 150° C/15mmHg to give an organohydrogenpolysiloxane compound having the structure shown for Compound 2 in Table 2.

Examples 3–27

Fourteen polymer compositions were prepared by mixing 5 parts of one of the fluorosilicone polymers listed in Table 1 with one of fourteen mixtures of 94.84 parts of trichlorotrifluoroethane, 0.15 part of a complex of divinyltetramethyldisiloxane and $H_2PtCl_6$, and 0.01 parts of a bis-(2-methoxyisopropyl) maleate.

Four crosslinker compositions were prepared by mixing 5 parts of one of the organohydrogenpolysiloxane compounds listed in Table 2, with 95 part portions of trichlorotrifluoroethane.

Thirty-seven curable coating compositions were prepared by mixing one of the polymer composition with one of the crosslinker composition in sufficient amounts to provide a desired number of hydrogen atoms for each silicon-bonded vinyl radical in the composition. Compositions comprising Polymers A, C, D, I, K, L or M and compositions comprising Compound 2 are compositions of this invention. Compositions comprising Polymers K, L or M and Compound 2 are preferred compositions of this invention.

Each composition was coated onto a piece of 2-mil polyester film using a #12 Mayer Rod and the coated film was heated at 121° C. or at 150° C. The time, in 15 second increments at each temperature, needed to reach the no migration, no rub-off condition was noted and is recorded in Table 3 as the cure time. The time, in days, that elapsed before the composition, stored at room temperature in a closed container, became a non-coatable composition was noted and is recorded in Table 3 as the bath life of the composition.

Release and subsequent adhesion for each cured coating were evaluated by the methods described above. The values are recorded in Tables 4 and 5.

TABLE 3

| Polymer | Crosslinker | Mol Ratio SiH/SiVi | Cure Time, sec. @ 121° C. | Cure Time, sec. @ 150° C. | Bath Life d. @ 25° C. |
|---|---|---|---|---|---|
| J | 1 | 6/1 | 45 | 15 | <3 |
| J | 2 | 6/1 | 15 | 15 | <3 |
| M | 1 | 4/1 | 15 | 15 | <3 |
| M | 2 | 4/1 | 15 | 15 | 2 |
| M | 4 | 4/1 | 15 | 15 | 6 |
| C | 1 | 4/1 | 60 | 15 | 2 |
| C | 3 | 4/1 | 30 | 15 | 1 |
| C | 2 | 4/1 | 15 | 15 | 9 |
| I | 1 | 4/1 | 30 | 15 | <3 |
| I | 2 | 4/1 | 15 | 15 | <3 |
| L | 1 | 3/1 | 15 | 15 | <3 |
| L | 2 | 3/1 | 15 | 15 | <3 |
| A | 1 | 2/1 | 60 | 15 | 4 |
| A | 3 | 2/1 | 15 | 15 | 1 |
| A | 2 | 2/1 | 15 | 15 | 4 |
| D | 1 | 2/1 | 90 | 45 | 6 |
| D | 3 | 2/1 | 45 | 15 | 2 |
| D | 2 | 2/1 | 15 | 15 | 10 |
| E | 1 | 2/1 | 30 | 15 | 2 |
| E | 3 | 2/1 | 15 | 15 | 0.3 |
| E | 2 | 2/1 | 15 | 15 | 1 |
| K | 1 | 2/1 | 15 | 15 | <3 |
| K | 2 | 2/1 | 15 | 15 | <3 |
| N | 1 | 2/1 | 30 | 15 | >3 |
| N | 2 | 2/1 | 15 | 15 | >3 |
| G | 1 | 1.1/1 | 30 | 15 | 20 |
| G | 3 | 1.1/1 | 30 | 15 | 20 |
| G | 2 | 1.1/1 | 15 | 15 | 20 |
| B | 1 | 1/1 | 90 | 60 | 6 |
| B | 3 | 1/1 | 15 | 15 | 6 |
| B | 2 | 1/1 | 30 | 15 | 10 |
| F | 1 | 1/1 | 15 | 15 | 1 |
| F | 3 | 1/1 | 60 | 15 | 1 |
| F | 2 | 1/1 | 15 | 15 | 4 |
| H | 1 | 1/1 | 60 | 15 | 2 |
| H | 3 | 1/1 | 30 | 15 | 3 |
| H | 2 | 1/1 | 30 | 15 | 9 |

TABLE 4

| Polymer; Crosslinker; SiH/SiVi | 28 Day Release, g/in. 1-Day | 28 Day Release, g/in. 3-Day | 28 Day Release, g/in. 7-Day Liner | Subsequent Adh. oz./in. 1-Day | Subsequent Adh. oz./in. 3-Day | Subsequent Adh. oz./in. 7-Day Liner |
|---|---|---|---|---|---|---|
| J;1;6/1 |  | 333 |  |  | 43 |  |
| J;2;6/1 |  | 133 |  |  | 47 |  |
| C;1;4/1 | 30 |  | 110 | 28 |  | 24 |
| C;3;4/1 | 30 |  | 73 | 23 |  | 22 |
| C;2;4/1 | 83 |  | 97 | 34 |  | 36 |
| I;1;4/1 |  | 37 |  |  | 53 |  |
| I;2;4/1 |  | 260 |  |  | 50 |  |
| M;1;4/1 |  | 40 |  |  | 47 |  |
| M;2;4/1 |  | 67 |  |  | 39 |  |
| L;1;3/1 |  | 43 |  |  | 39 |  |
| L;2;3/1 |  | 127 |  |  | 41 |  |
| A;1;2/1 | 100 |  | 323 | 23 |  | 40 |
| A;3;2/1 | 153 |  | 170 | 35 |  | 54 |
| A;2;2/1 | 117 |  | 343 | 26 |  | 51 |
| D;1;2/1 | 47 |  | 117 | 26 |  | 38 |
| D;3;2/1 | 187 |  | 177 | 38 |  | 46 |
| D;2;2/1 | 247 |  | 167 | 40 |  | 40 |
| E;1;2/1 | 297 |  | 263 | 37 |  | 52 |
| E;3;2/1 | 220 |  | 43 | 38 |  | 52 |
| E;2;2/1 | 240 |  | 127 | 39 |  | 52 |
| K;1;2/1 |  | 160 |  |  | 45 |  |
| K;2;2/1 |  | 70 |  |  | 39 |  |
| N;1;2/1 |  | 133 |  |  | 44 |  |
| N;2;2/1 |  | 60 |  |  | 40 |  |
| B;1;1/1 | 740 |  | 420 | 27 |  | 26 |
| B;3;1/1 | 397 |  | 420 | 34 |  | 33 |
| B;2;1/1 | 270 |  | 167 | 31 |  | 34 |
| H;1;1/1 | 277 |  | 357 | 44 |  | 41 |
| H;3;1/1 | 243 |  | 163 | 39 |  | 32 |

TABLE 4-continued

| Polymer; Crosslinker; SiH/SiVi | 28 Day Release, g/in. 1-Day | 28 Day Release, g/in. 3-Day | 28 Day Release, g/in. 7-Day Liner | Subsequent Adh. oz./in. 1-Day | Subsequent Adh. oz./in. 3-Day | Subsequent Adh. oz./in. 7-Day Liner |
|---|---|---|---|---|---|---|
| H;2;1/1 | 157 |  | 130 | 45 |  | 51 |
| G;1;1.1/1 | 220 |  | 363 | 12 |  | 31 |
| G;3;1.1/1 | 450 |  | 250 | 39 |  | 34 |
| G;2;1.1/1 | 307 |  | 320 | 18 |  | 35 |
| Stainless Steel | 63 oz/in. |  |  | 26 (41%) |  |  |

TABLE 5

| Polymer; Crosslinker; SiH/SiVi | 28 Day Release, g/in. 1-Day | 28 Day Release, g/in. 3-Day | 28 Day Release, g/in. 7-Day Liner | Subsequent Adh. oz./in. 1-Day | Subsequent Adh. oz./in. 3-Day | Subsequent Adh. oz./in. 7-Day Liner |
|---|---|---|---|---|---|---|
| J;1;6/1 |  | 363 |  |  | 51 |  |
| J;2;6/1 |  | 80 |  |  | 45 |  |
| C;1;4/1 | 30 |  | 67 | 23 |  | 31 |
| C;3;4/1 | 30 |  | 33 | 22 |  | 54 |
| C;2;4/1 | 30 |  | 40 | 29 |  | 36 |
| I;1;4/1 |  | 40 |  |  | 41 |  |
| I;2;4/1 |  | 223 |  |  | 45 |  |
| M;1;4/1 |  | 43 |  |  | 47 |  |
| M;2;4/1 |  | 53 |  |  | 51 |  |
| L;1;3/1 |  | 43 |  |  | 48 |  |
| L;2;3/1 |  | 30 |  |  | 49 |  |
| A;1;2/1 | 93 |  | 167 | 28 |  | 34 |
| A;3;2/1 | 30 |  | 23 | 39 |  | 50 |
| A;2;2/1 | 23 |  | 60 | 33 |  | 49 |
| D;1;2/1 | 193 |  | 187 | 41 |  | 38 |
| D;3;2/1 | 57 |  | 180 | 47 |  | 38 |
| D;2;2/1 | 373 |  | 287 | 49 |  | 48 |
| E;1;2/1 | 387 |  | 203 | 33 |  | 53 |
| E;3;2/1 | 643 |  | 337 | 43 |  | 43 |
| E;2;2/1 | 347 |  | 187 | 47 |  | 48 |
| K;1;2/1 |  | 217 |  |  | 48 |  |
| K;2;2/1 |  | 30 |  |  | 51 |  |
| N;1;2/1 |  | 73 |  |  | 41 |  |
| N;2;2/1 |  | 87 |  |  | 45 |  |
| B;1;1/1 | 347 |  | 343 | 25 |  | 15 |
| B;3;1/1 | 433 |  | 220 | 31 |  | 29 |
| B;2;1/1 | 297 |  | 183 | 30 |  | 20 |
| H;1;1/1 | 130 |  | 220 | 42 |  | 50 |
| H;3;1/1 | 337 |  | 190 | 50 |  | 57 |
| H;2;1/1 | 130 |  | 153 | 46 |  | 50 |
| G;1;1.1/1 | 227 |  | 180 | 35 |  | 34 |
| G;3;1.1/1 | 257 |  | 583 | 31 |  | 38 |
| G;2;1.1/1 | 407 |  | 313 | 37 |  | 27 |
| Stainless Steel | 63 oz/in. |  |  | 26 (41%) |  |  |

Observations from the Tables

With respect to cure time and/or bath life (Table 3), compositions containing Compound 2 (this invention) are better than analogous compositions containing Compounds 1 or 3 instead of Compound 2, regardless of the fluorosilicone polymer that is present; with the exception of compositions containing Polymers K, L amd M, which are preferred fluorosilicone polymers of this invention as well, and display rapid cure, regardless of the organohydrogenpolysiloxane compound that is used.

Release of a SPSA (Table 4) from a liner cured with Compound 2 at 121° C. and aged 1 day before being laminated varies from 67-307 g/in. Polymers A, C, K, L and M, as well as Polymers N, H and J, provide less than 200 g/in release. Polymers G, B, I, D and E provide greater than 200 g/in release.

Release of a SPSA (Table 5) from a liner cured with Compound 2 at 150° C. and aged 1 day before being laminated varies from 23–407 g/in. Polymers A, C, K, L and M, as well as Polymers N, H and J provide less than 200 g/in release. Polymers G, B, I, D and E provide greater than 200 g/in release.

THAT WHICH IS CLAIMED IS:

1. A fluorosilicone polymer having the formula ViMe$_2$SiO(Me$_2$SiO)$_x${(RQ)MeSiO}$_y$(MeViSiO)$_z$SiMe$_2$Vi, wherein Vi denotes a vinyl radical, Me denotes a methyl radical, RQ denotes a silicon-bonded fluorinated radical wherein R denotes a perfluoroalkyl radical having from 4 to 8 carbon atoms, Q denotes an alkylene radical linking R to Si through at least 2 carbon atoms, and the values of $x$, $y$ and $z$ are such that the fluorosilicone polymer contains at least 300 silicon atoms, from 0.5 to 2 mol percent vinyl radical-containing siloxane units and 30 mol percent (RQ)MeSiO$_{2/2}$ siloxane units.

2. A fluorosilicone polymer according to claim 1 wherein each RQ radical has the formula CF$_3$CF$_2$CF$_2$CF$_2$CH$_2$CH$_2$.

3. A fluorosilicone polymer according to claim 2 wherein $x+y+z$ has a value of 2500, $y$ has a value of 750 and $z$ has a value of 12.5.

* * * * *